UNITED STATES PATENT OFFICE.

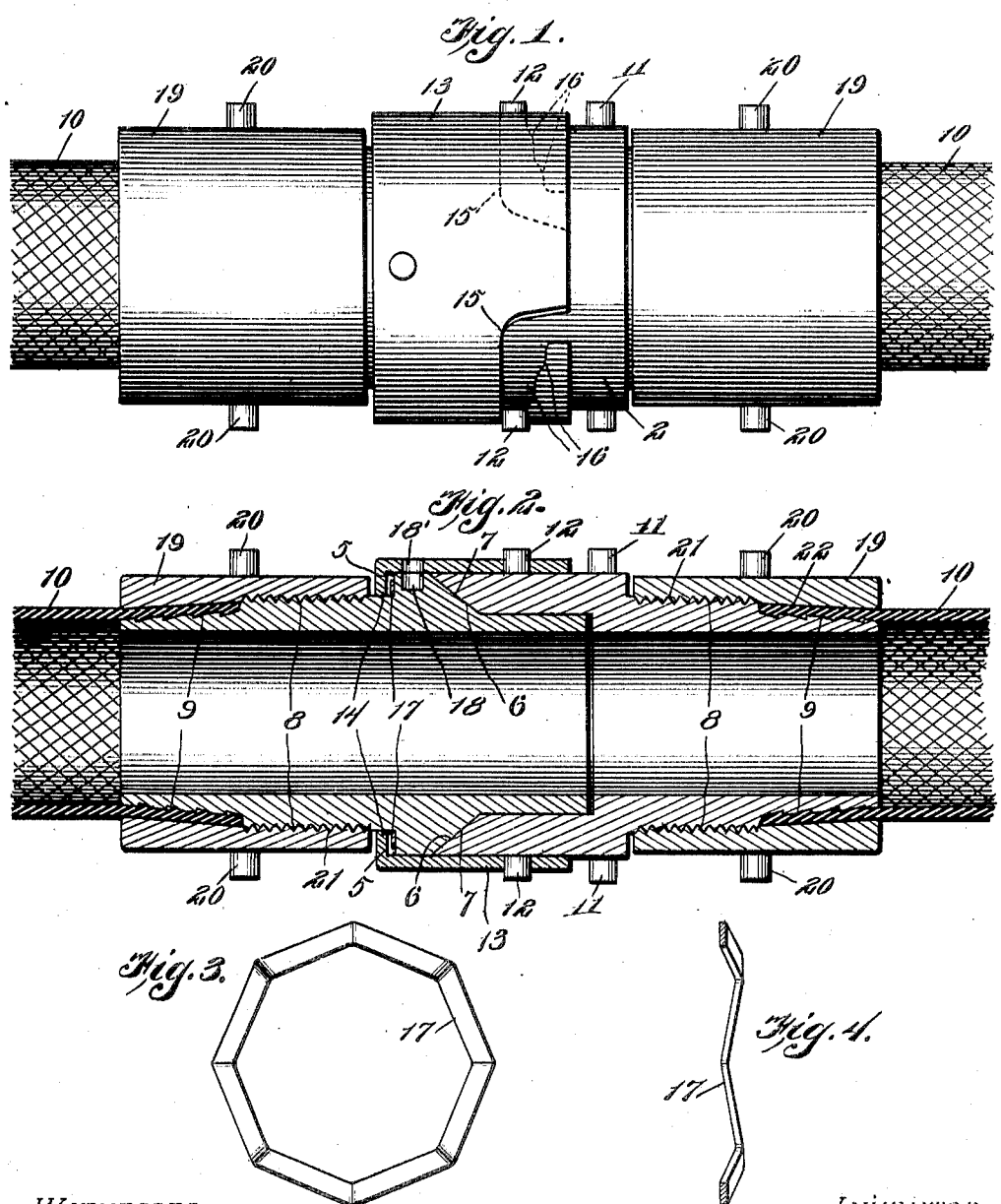

JOSEPH R. KILE, OF NEODESHA, KANSAS.

HOSE-COUPLING.

1,089,650.   Specification of Letters Patent.   Patented Mar. 10, 1914.

Application filed April 9, 1912. Serial No. 689,638.

*To all whom it may concern:*

Be it known that I, JOSEPH R. KILE, a citizen of the United States, residing at Neodesha, in the county of Wilson and State of Kansas, have invented certain new and useful Improvements in Hose-Couplings, of which the following is a specification.

This invention relates to hose couplings, the main object of the invention being to provide a simple, reliable and efficient construction of coupling for connecting the meeting ends of hose sections, and the members of which are adapted to be coupled and uncoupled in an easy and ready manner.

A further object of the invention is to provide a construction of coupler in which the male and female sections are adapted to form a water-tight union without the use of threads, which admits of the practically instantaneous connection and disconnection of the hose sections, which is provided with simple and effective means for taking up slack or compensating for wear of the coupling members to maintain a tight joint, which is adapted to hold the coupling members in firm engagement and admit of the same being rigidly locked together when required, and which is adapted by slight modification for either high or low pressure service.

The invention consists of the features of construction, combination and arrangement of parts, hereinafter fully described and claimed, reference being had to the accompanying drawing, in which:—

Figure 1 is a view in side elevation showing two sections of a hose united by my improved coupler, the parts being respectively shown in side elevation and longitudinal section below and above the line X—X. Fig. 2 is a longitudinal section of the same. Fig. 3 is a face view of the spring washer. Fig. 4 is a sectional view of the same.

The coupling comprises two main members, to wit: a male member 1 and a female member 2. The member 1 is provided with a smooth cylindrical outer end 3 for insertion within a corresponding socket 4 in the member 2, and is also provided with a circumferential flange or enlargement presenting at one side a straight shoulder 5 and at its opposite side a beveled shoulder 6, which latter is adapted for engagement with a beveled surface 7 at the inner end of the member 2, to form a water-tight joint or union. The outer ends of the respective sections 1 and 2 are provided with externally threaded inner portions 8 and beveled serrated or toothed outer portions 9, which latter are adapted to receive the meeting ends of the hose sections 10. The member 2 is provided with two sets or series of lugs or projections 11 and 12, the outer series of lugs 11 being adapted for engagement by the fingers or a wrench to facilitate the connection and disconnection of the main coupling elements, while the lugs or projections 12 are adapted for use in conjunction with a coupling sleeve or member 13 to lock the said two main coupling sections or members 1 and 2 together. The sleeve 13 is adapted to snugly embrace the meeting portions of the sections 1 and 2 and is provided at one end with an inturned flange 14 adapted to come opposite the shoulder 5 when the parts are coupled together. Said sleeve 13 is provided at its opposite end with a series of bayonet slots 15 for engagement and coöperation with the lugs 12. The outer walls of the transverse or circumferential portions of said slots are scalloped to provide a series of seat recesses 16 in which said lugs 12 may rest to more securely retain the coupling sleeve in position and hold it against retrograde movement and disconnection.

Disposed between the shoulder 5 of the member 1 and flange 14 of the sleeve 13 is a spring washer 17 having a plurality of angular faces alternately bent or deflected laterally in opposite directions. As shown in the present instance, the spring washer is of octagonal form, and its alternately bent angular portions or faces are adapted to bear respectively at their points of union against the said shoulder 5 and flange 14 to hold the sleeve 13 in locking engagement with the lugs 12 and the faces 6 and 7 of the members 1 and 2 in close contact, so that an absolutely water-tight joint or union will be produced. The spring is adapted to take up any play or looseness of the parts due to wear or other causes, and thus automatically make the connection water-tight at all times.

Adjacent to the shoulder 5 and flange 14 the member 1 and sleeve 13 are respectively provided with recesses 18 and openings 18' adapted to register when the parts are coupled together, so that the points of a spanner wrench or suitable locking plugs or keys may be inserted therein to rigidly hold the parts connected, against any possibility of casual disconnection, a special and effective provision against relative movement and leakage when the coupling is used in connection with high pressure conductors. This construction also enables the coupling members to be held fixed against movement while the sleeves 19 are being screwed on or off.

The meeting ends of the hose sections 10 are slipped upon the beveled and serrated ends 8 of the members 1 and 2 and are adapted to be held firmly clamped thereto by clamping members 19, each comprising a tube or sleeve having wrench engaging lugs 20. The inner end of each clamping member has an internally threaded portion 21 to engage the threaded portion 8 of the coupling member to which it is applied and a beveled surface 22 to engage the end of the hose and crowd and clamp the same against the beveled and serrated surface 9 of the coupling member to which it is applied, thus firmly holding the end of the hose against any possibility of disconnection. These clamping members are particularly designed for high pressure service.

In the operation of uniting the meeting ends of hose sections provided with my improved coupler the meeting portions of the sections 1 and 2 are brought into approximate relation, the sleeve 13 adjusted so that the entrance ends of the bayonet slots 15 will register with the lugs 12, and the parts brought together so that the end 3 of the section 1 will fit within the socket 4 of the section 2 and the lugs 12 within the outer ends of the slots 15, after which by turning the sleeve 13 until the lugs 12 are brought to the desired degree within the inner ends of said slots 15 the joint-closing surfaces 6 and 7 of the members 1 and 2 will be brought into abutting relation. In this operation the spring 17 will be compressed and by its tendency to react will hold the parts firmly assembled and the lugs 12 in engagement with the seats 16, so as to avoid possibility of casual retrograde motion of the sleeve 13 and loosening or disconnection of the coupling members. Where it is desired to lock the members 1 and 2 rigidly together to prevent the sleeve from turning while the coupled hose sections, for instance, are being drawn along the ground or manipulated, this may be accomplished by inserting key plugs or the points of a spanner wrench within the registering recesses 18 and openings 18'. To uncouple the sections it is simply necessary to turn the sleeve 13 back until the lugs 12 again register with the entrance ends of the slots 15, whereupon the hose sections may be released from engagement with each other, which action will be promoted by the expansion of the spring 17.

It will be observed that by the construction described the use of threaded surfaces between the parts 1, 2 and 13 is avoided, and that the construction of the fastening connections is such that the sleeve 13 may be easily and conveniently adjusted to locking and releasing position without the use of tools.

Having thus described the invention, what I claim as new is:—

A hose coupling embodying male and female sections having telescoping cylindrical portions provided with conical abutting faces extending to the periphery of the sections, one of said sections having an abutment shoulder and the other diametrically disposed locking lugs, a coupling ring uniting said sections and closing the joint between said conical abutting faces at the periphery of said sections, said ring being provided at one end with a flange opposing said shoulder and at its opposite ends with cam slots formed with corrugated outer walls to interlock with said lugs, and a ring-shaped flat metal spring disposed between said flange and shoulder and having angularly related portions alternately bent in opposite directions and respectively bearing on the flange and shoulder, said spring serving to force the flange away from the shoulder and thereby exerting endwise pressure on the sleeve to hold the conical faces in close contact and also maintain the corrugated walls of the cam slots in interlocking engagement with the lugs, substantially as described.

In testimony whereof I affix my signature in presence of two witnesses.

JOSEPH R. KILE.

Witnesses:
A. H. WARD,
H. H. KIMBALL.